(No Model.)
J. M. HOWARD.
HOISTING MACHINE.
No. 543,936. Patented Aug. 6, 1895.
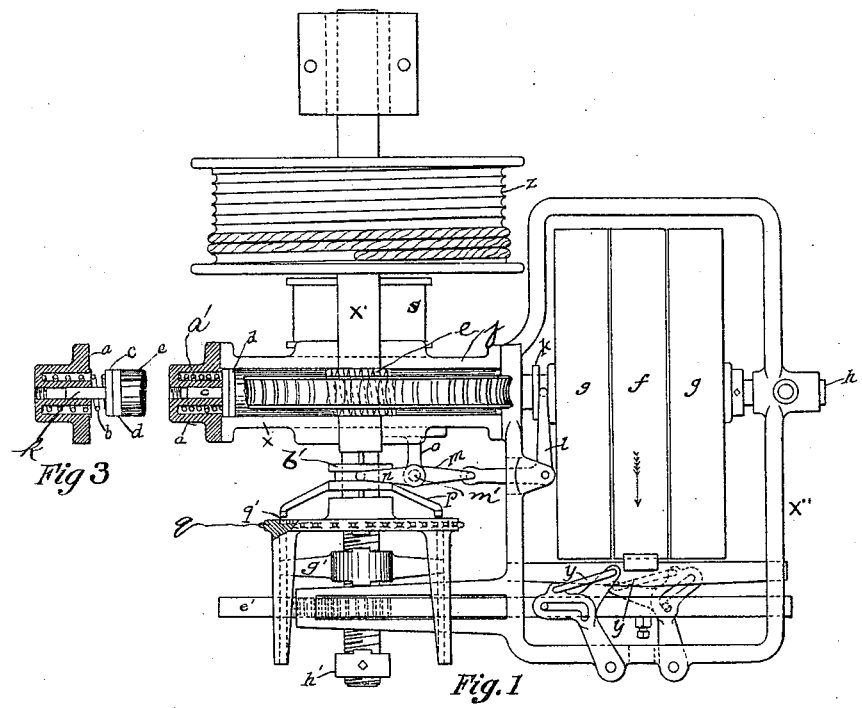
Fig. 3
Fig. 1
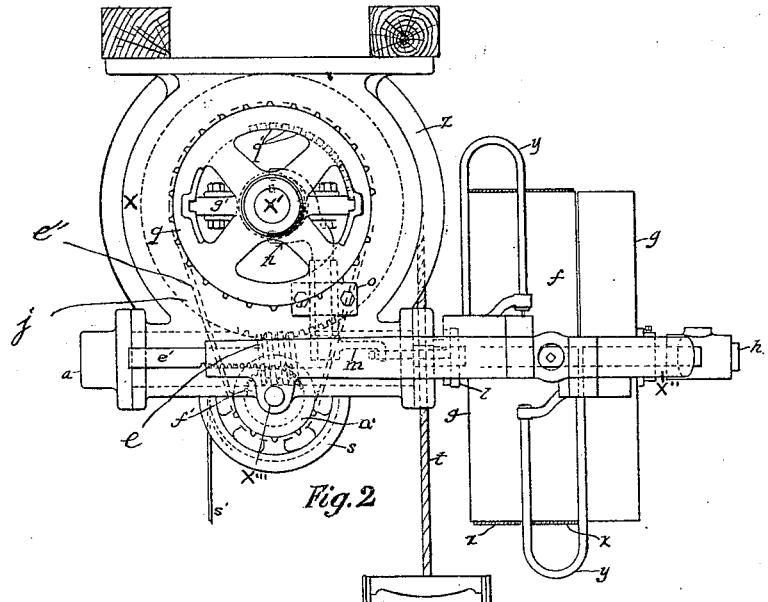
Fig. 2
Witnesses
Thomas Johnson
Wm H Howald
Inventor
John Martin Howard
By Geo Chapin Howard atty

UNITED STATES PATENT OFFICE.

JOHN M. HOWARD, OF CHICAGO, ILLINOIS.

HOISTING-MACHINE.

SPECIFICATION forming part of Letters Patent No. 543,936, dated August 6, 1895.

Application filed June 18, 1894. Serial No. 515,074. (No model.)

*To all whom it may concern:*

Be it known that I, JOHN MARTIN HOWARD, a citizen of the United States of America, residing at Chicago, in the county of Cook and State of Illinois, have invented certain new and useful Improvements in Hoisting-Machines, of which the following is a specification, reference being had therein to the accompanying drawings.

The object of my improvement is to provide in hoisting-engines used for elevating passengers and freight means whereby, when from any cause the car or platform becomes obstructed in its descent, the driving-belts will be so shifted as to stop the rotation of the winding-drum.

In the drawings, Figure 1 is a plan, Fig. 2 is a side view, and Fig. 3 illustrates a detail.

$h$ is a driving-shaft, having thereon fast pulley $f$ and loose pulleys $g$ $g$. This shaft $h$ is geared with shaft $x'$ at right angles thereto by means of a worm $e$ on shaft $h$, meshing with a worm-wheel $j$ on shaft $x'$. On this shaft $x'$ is fixed the drum $z$, on which is wound the rope $t$, connected at its lower end to the car $u$. The shaft $h$ has projecting from it at one end a guide-pin $k$.

$a$ is a cap into which the pin $k$ projects, and is fastened to the casing $x$ inclosing the gearing. Between the cap and inclosed thereby and bearing against the washers $d$ is a spring $a'$. Fast on the shaft $h$ is a peripherally-grooved collar $k$, and into the groove extend pins on the forked arm of a bell-crank lever $l$. The other arm of this lever is engaged by the end of an arm $m$ on an upright shaft $m'$. This shaft at its upper end is provided with a laterally-projecting fork $n$, which engages a peripheral groove in a collar $b'$ splined on the shaft $x'$. The shaft $m$ is journaled in a bearing supported by a projection $o$ from the casing $x$. The collar $b'$ is formed with fingers $p$, having teeth on their ends forming one member of a clutch and adapted to engage corresponding depressions (forming the other member of the clutch) in the face of a sprocket-wheel $q$ loosely mounted on the shaft $x'$. Fast on a shaft $x'''$ parallel with shaft $x'$ is a sprocket-wheel $a'$ connected with sprocket-wheel $q$ by a chain $e''$. Fast on the shaft $x'''$ is a pinion $f'$ meshing with a rack $e'$, provided at one end with suitable devices $y$ for shifting the driving-belts. The devices shown in the drawings for shifting the belts are those fully shown and described in the patent granted George C. Howard, dated August 18, 1868, No. 81,170.

The operation is as follows: In the ordinary operation, when the car or other load is lowering, the weight of the car, acting through the winding-drum $z$, shaft $x'$, worm-wheel $j$, and worm $e$, will produce a thrust in the shaft $h$, so as to shift this shaft and all of the parts thereon toward the left, Fig. 1, and compress the spring $a'$. The parts will then be in the positions shown in Fig. 1. In case the car in its descent meets with an obstruction, such as $v$ in Fig. 2, the weight of the car will be removed and the spring $b$ will then expand, as in Fig. 3, and the shaft $h$ will be shifted toward the right from the position shown in Fig. 1. This movement of the shaft $h$, through collar $k$, bell-crank lever $e$, arm $m$, shaft $m'$, and collar $b'$, with fingers $p$, will connect the sprocket-wheel $q$ with the shaft $x'$. The motion of the shaft $x'$ will thus be conveyed to the sprocket-wheel $q$ and through the pinion $f'$ to the rack $e$, whereby the belts will be shifted and the rotation of the winding-drum stopped.

In the drawings is shown means for automatically stopping the rotation of the winding-drum when the car has reached the limits of its travel in either direction. These means are well known and form no part of the present invention.

In the ordinary operation of the elevator the belts are shifted by means of the ordinary controller-rope $s'$ passing around pulley $s$ on shaft $x'''$. When the shaft $h$ is shifted by the spring $b$, the pulleys $f$ and $g$ $g$ will be shifted in the direction that the belts are. This movement of the pulleys, however, will be very slight as compared with that of the belts.

What I claim as my invention, and desire to secure by Letters Patent, is—

1. The combination with the shaft $h$ carrying fast and loose pulleys $f$, $g$, $g$, and belt shifting devices, of the shaft $x'$, drum $z$ thereon, a rope wound on said drum and carrying a load, gearing connecting shafts $h$, and $x'$, the sprocket wheel $q$, a clutch adapted to connect sprocket wheel $q$ with shaft $x'$, connections whereby or between sprocket wheel $q$ and the belt shifting devices, and means whereby the clutch is operated to connect the sprocket wheel $q$ with the shaft $x'$ and shift the belt shifting devices to stop the winding drum when the load meets with an obstruction in its descent, substantially as described.

2. The combination with the shaft $h$ carrying fast and loose pulleys $f$, $g$, $g$, and belt shifting devices of the shaft $x'$, drum $z$ thereon, a rope wound on said drum and carrying a load, gearing connecting shafts $h$ and $x'$, collar $k$ on shaft $h$, lever $l$ engaging collar $k$, shaft $m'$ connected to lever $l$, sprocket wheel $q$ connected to shaft $m'$, a clutch adapted to connect sprocket wheel $q$ with shaft $x'$, means whereby the clutch is operated to connect sprocket wheel $q$ with shaft $x'$ when the load meets with an obstruction in its descent, and connections between sprocket wheel $q$ and the belt shifting devices, substantially as described.

In testimony whereof I affix my signature in presence of two witnesses.

JOHN M. HOWARD.

Witnesses:
GEO. W. HAYS,
SAMUEL ARTHUR.